Aug. 16, 1966 D. J. BARTELINK 3,267,299

PULSE GENERATOR

Filed March 10, 1964 4 Sheets-Sheet 1

INVENTOR
D.J. BARTELINK
BY
Lyman Sherman
ATTORNEY

Aug. 16, 1966 D. J. BARTELINK 3,267,299

PULSE GENERATOR

Filed March 10, 1964 4 Sheets-Sheet 2

PULSE GENERATOR

Filed March 10, 1964 4 Sheets-Sheet 4

United States Patent Office 3,267,299
Patented August 16, 1966

3,267,299

PULSE GENERATOR

Dirk J. Bartelink, Westfield, N.J., assignor to Bell Telephone Laboratories, Incorporated, New York, N.Y., a corporation of New York Filed Mar. 10, 1964, Ser. No. 350,808
12 Claims. (Cl. 307—109)

This invention relates to pulse generators and, in particular, to solid state, high current, pulse generators.

Because of its large current handling capabilities and because its firing time can be controlled, the silicon controlled rectifiers (SCR) described in the SCR Manual published in 1961 by the General Electric Company, appears to be an attractive control element in a pulse generator. However, while these units can be gated on rapidly (0.1 microsecond) due to the avalanche multiplication process, a rapid turn-off can only be effected by the application of a reverse voltage. Since the turn-off process takes several microseconds to accomplish, there is an inherent limitation on the minimum pulse width that can be generated using an SCR as the control element in a pulse circuit. In addition, an abrupt turn-off tends to generate undesirable current surges which, in turn, distort the output pulse.

It is, accordingly, an object of this invention to generate pulses whose widths can be less than the inherent on-off time of the pulse control element.

It is a further object of this invention to produce pulses of variable pulse widths.

In accordance with the invention, these objects are accomplished by sequentially passing current from two separately controlled sources through a common load in opposite directions. The two currents are adjusted, both in amplitude and waveform, so as to cancel each other when both are flowing.

A pulse is initiated by causing current to flow through the load from only one of the sources. At the end of a specified period, the second source is activated, producing an equal and oppositely flowing current through the load. The two currents cancel each other, thereby terminating the pulse.

In a first illustrative embodiment of the invention, two capacitors are discharged in opposite directions through a common load. The time interval between discharges, which defines the pulse width, is controlled by means of a pair of separately gated silicon controlled rectifiers. While each of the individual rectifiers continues to conduct for a relatively long period until the current supplied by the capacitor decays to a level at which the rectifiers turn off, the output current pulse through the load can be as narrow as a fraction of a microsecond.

In one of the specific illustrative embodiments of the invention to be described hereinafter, the capacitors are charged through a second pair of silicon controlled rectifiers. Charging continues until the charging current decreases to a level at which the charging rectifiers turn themselves off. Thus, it is an advantage of the present invention that both the charging and discharging periods can be terminated without the need for additional external circuitry.

While large current pulses of short duration can be generated by discharging capacitors, the total energy available from such a source is limited. In a second group of illustrative embodiments of the invention, an alternating current source is used as the primary source of current. Capacitors are also used in those situations requiring a rapid rise time.

As in the first embodiment, the direction and timing of the current through the common load resistor is controlled by means of a pair of separately gated silicon controlled rectifiers.

While the invention has been described as a current pulse generator using silicon controlled rectifiers, it is obvious that the inventive concept can be applied to pulse generators generally, using other types of control devices, such as transistors, vacuum tubes and gas tubes. The invention has particular utility whenever it is desired to generate pulses having pulse widths that are narrower than the control element is inherently capable of generating.

These and other objects and advantages, the nature of the present invention, and its various features, will appear more fully upon consideration of the various illustrative embodiments now to be described in detail in connection with the accompanying drawings, in which.

Figure 2:
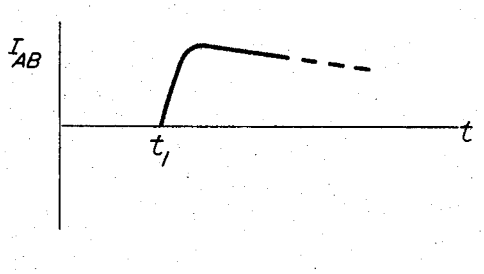
Figure 3:
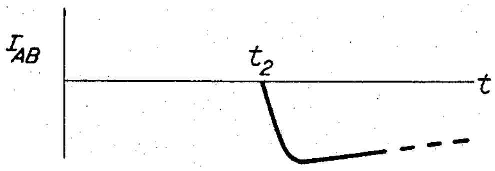
Figure 4:
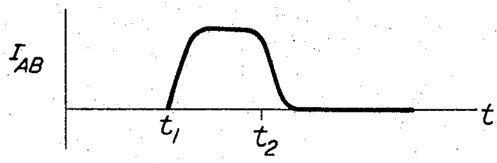
Figure 5:
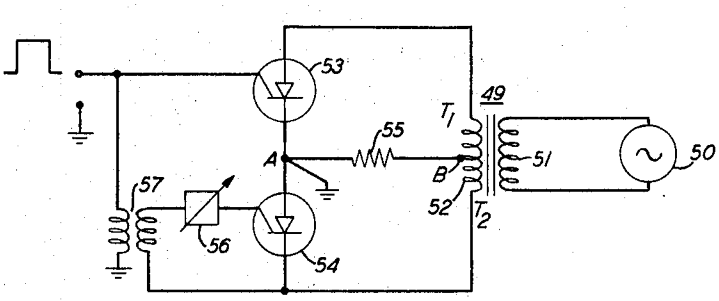
Figure 10:
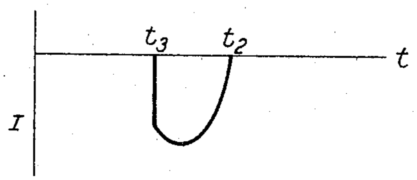
Figure 11:
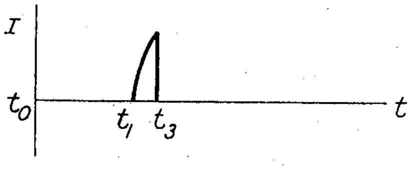
Figure 12:
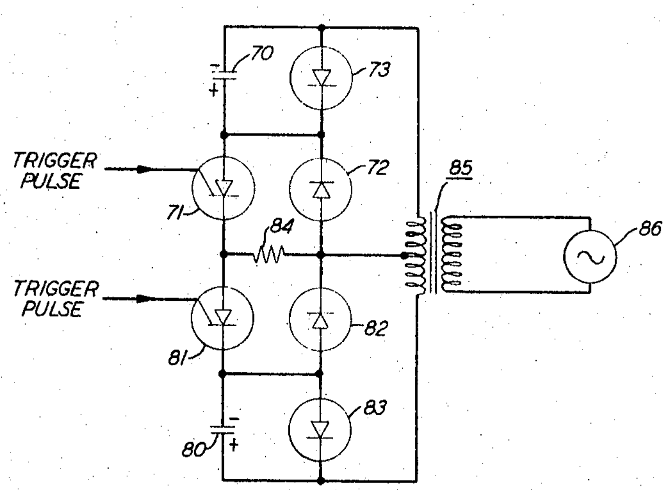
Figure 13:
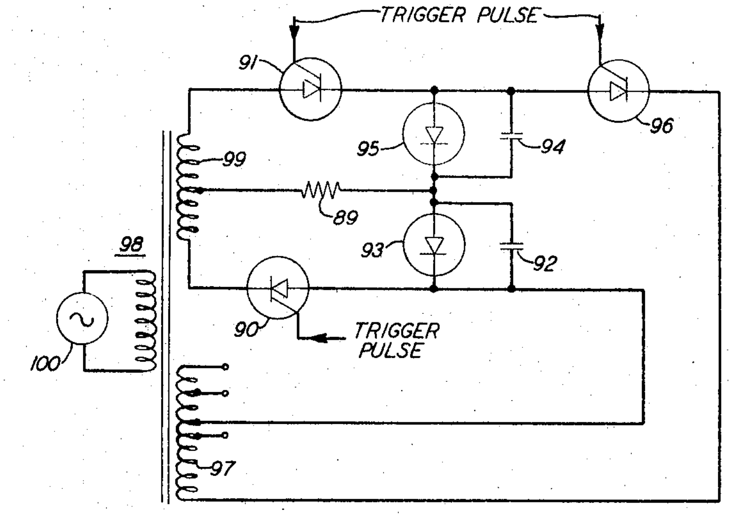

FIGS. 2, 3 and 4, given for purposes of explanation, show the currents through the load resistor at various times during the discharge cycle;

FIG. 5 is a second illustrative embodiment of the invention using silicon controlled rectifiers and an alternating current source and center-tapped transformers;

FIGS. 6, 7, 8, 9, 10 and 11, given for purposes of explanation, show the various currents and voltages in the embodiment of FIG. 5 over a period of a cycle; and FIGS. 12 and 13 are modifications of the embodiment of FIG. 5 including means for producing an initial current surge for pulses having small rise and fall times.

Figure 1A:
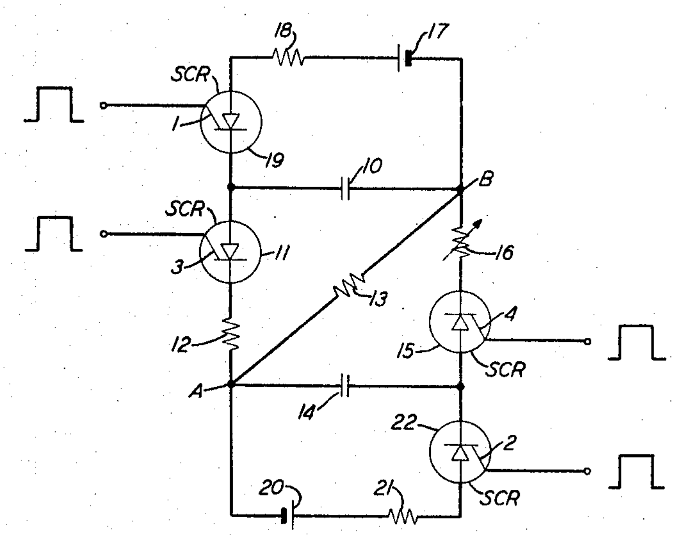
FIG. 1A is a first embodiment of the invention using silicon controlled rectifiers and discharging capacitors.

Referring to FIG. 1A, there is shown an illustrative embodiment of a pulse generator in accordance with the invention, using silicon controlled rectifiers as control elements. The pulser comprises a pair of discharge circuits arranged in a bridge configuration in which the diagonal branch, common to both discharge circuits, includes the useful load. The first discharge circuit comprises capacitor 10, silicon controlled rectifier 11, resistor 12 and the load resistor 13. The second discharge circuit comprises capacitor 14, silicon controlled rectifier 15, resistor 16 and the load resistor 13. The latter, as mentioned hereinabove, is common to both discharge circuits.

In addition, there are separate charging circuits for charging capacitors 10 and 14. The charging circuit for capacitor 10 comprises a direct current source 17, a resistor 18 and silicon controlled rectifier 19. The charging circuit for capacitor 14 comprises a direct current source 20, resistor 21 and silicon controlled rectifier 22.

In operation, gating pulses, derived from a pulse generator (not shown), are applied to the gate electrodes 1 and 2 of rectifiers 19 and 22, respectively. This causes these rectifiers to fire, permitting current to flow from the current sources to the capacitors, thus charging capacitors 10 and 14. Current continues to flow until the current decreases to the level of the holding current for the rectifiers, at which time the rectifiers cease to conduct and return to the forward-blocked state.

A current pulse is developed in load resistor 13 by discharging capacitors 10 and 14 through resistor 13 in rapid sequence. The order in which the capacitors are discharged determines the polarity of the pulse. The time interval between discharges determines the pulse width.

Referring to FIG. 1A, and for purposes of explanation, the discharge of capacitor 10 is initiated first, at time $t_1$, by the application of a gating pulse to the gate electrode 3 of rectifier 11. Upon firing, current flows from the positively charged electrode of capacitor 10 to its negatively charged electrode through the series circuit comprising rectifier 11, resistor 12 and load resistor 13.

The discharge current from capacitor 10, which flows through resistor 13 in the direction from A and B, is represented as a function of time in FIG. 2. The current, which rises rapidly to a maximum value, would normally begin to decrease exponentially as a function of the time constant of the circuit. However, because in practice the entire cross section of the rectifier does not go into breakdown at once, only a small fraction of the total rectifier cross section carries current initially. As this area increases, there is a corresponding decrease in the rectifier resistance. This produces a compensating effect which tends to maintain a more nearly constant current over a short interval.

The discharge of capacitor 14 is initiated at a predetermined time $t_2$, later than $t_1$, by the application of a delayed gating pulse to the gate electrode 4 of rectifier 15. Upon firing, current flows from the positively charged electrode of capacitor 14 to its negatively charged electrode through the series circuit comprising rectifier 15, resistor 16 and load resistor 13.

The discharge current from capacitor 14 flows through resistor 13 in the direction B to A, which is opposite to the direction of flow of the discharge current from capacitor 10. In terms of current flow from A to B, the discharge current from capacitor 14 is a negative current as represented in FIG. 3.

By making the two discharge circuits substantially the same, the discharge currents are made substantially the same. Hence, the net current through the load resistor 13, which comprises the difference of the two discharge currents, can be represented as in FIG. 4. In the interval $t_1$ to $t_2$, the current through resistor 13 is the discharge current from capacitor 10. In the period after time $t_2$, the current is the difference between the discharge currents from the two capacitors. As the period from $t_1$ to $t_2$ is typically small compared to the total discharge period, the two currents are substantially equal, and the net current in resistor 13 after time $t_2$ is substantially zero.

Recognizing that variations in the various circuit components can unbalance the discharge currents, equalizing means advantageously are provided in one or both of the discharge circuits. For example, in FIG. 1A, resistor 16 can be made variable and is set at a value which produces the desired current cancellation in the period after time $t_2$. Other methods of equalization can be used, including means for varying the amplitude of the current sources 20 and 17, or means for adjusting the size of capacitors 10 and 14.

It will be noted that while the net current through the load is zero after time $t_2$, the rectifiers continue to conduct until the discharge currents fall below the hold current, at which time the rectifiers cut off. Thus, while the output from the pulser is a narrow pulse, there is no external circuitry required to turn off the rectifiers at any particular time.

In an embodiment constructed in accordance with the invention using type C80 rectifiers, and 600 microfarad capacitors charged by means of 135 volt sources, it was possible to generate 4,000 ampere pulses, having pulse widths between 0.15 $\mu$sec. and 5 $\mu$sec., at a repetition rate of 1 to 2 pulses per second.

In the design of a high current, narrow pulse generator using silicon controlled rectifiers, the so-called "rate effect" should be taken into consideration. For a discussion of this effect and means for minimizing it, see the article by Richard A. Stasior in the January 10, 1964 issue of Electronics entitled "How to Suppress Rate Effect in PNPN Devices." In the instant case, the charging rectifiers (2N 688) were derated in the design of the pulser to take into account the rate effect and the difficulties were avoided.

Figure 1B:
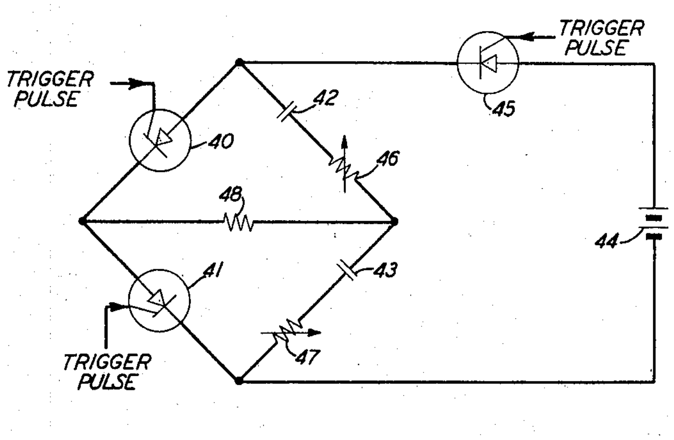
FIG. 1B is an alternate arrangement of the embodiment of FIG. 1A.

In the embodiment of FIG. 1A, the two control elements 11 and 15 and the two capacitors 10 and 14 are located in mutually opposite branches of the bridge circuits. Such an arrangement necessitates separate charging circuits. FIG. 1B is an alternate arrangement of the embodiment of FIG. 1A, in which the two control elements 40 and 41 and the two capacitors 42 and 43 are located in adjacent branches of the bridge circuit. In this arrangement, the two capacitors can be charged from a common source 44 through a single control element 45, which together comprise one diagonal branch of the bridge. In addition, in the embodiment of FIG. 1B, the current limiting resistors 46 and 47 are located in the capacitor branches and both are shown as variable. As before, the output load circuit 48 is common to both discharge circuits and comprises the other diagonal branch of the bridge.

In the embodiments of FIG. 1A and FIG. 1B, the total current available is derived from the charging capacitors. In the embodiments to be described hereinafter, the output current is derived primarily from an alternating current source. In the first of these embodiments, shown in FIG. 5, a saw-tooth pulse is generated. Other pulse shapes which conform to the shape of the alternating current source are also possible as will be described hereinbelow.

In the embodiment of the invention shown in FIG. 5, the charging circuit, and the capacitors 10 and 14, are replaced by an alternating current source 50 and a transformer 49. The source 50 is connected to the primary winding 51 of the transformer. The discharge circuits comprise the center-tapped secondary winding 52 of the transformer, the silicon controlled rectifiers 53 and 54, and the common load 55. The rectifiers are serially connected in like polarity across secondary winding 52. In particular, end $T_1$ of winding 52 is connected to the anode electrode of rectifier 53 and end $T_2$ is connected to the cathode of rectifier 54. The center-tap, B, is connected to one end of load 55. The anode of rectifier 54, and the cathode of rectifier 53 connect to a common junction, A, shown at ground potential, along with the other end of load 55.

Also shown in FIG. 5 are connections to the gate electrodes of the rectifiers. These include a variable delay network 56 and an isolating transformer 57, in the gate circuit of rectifier 54 for delaying the firing of rectifier 54 with respect to the firing of rectifier 53.

Figure 6:
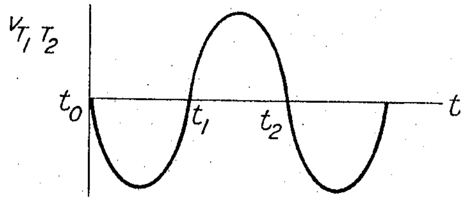
Figure 7:
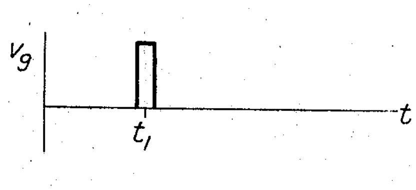
Figure 8:
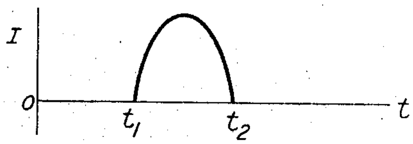

FIG. 6 shows the voltage variation across the secondary winding 52 of transformer 49. During the period from $t_0$ to $t_1$, the voltage at terminal $T_1$ is negative with respect to the voltage at terminal $T_2$, and the rectifiers are reversed-biased, i.e., in the open state. During this period, a gating pulse, applied to the rectifiers will not fire them. However, in the period $t_1$ to $t_2$, the secondary voltage reverses polarity, forward-biasing the rectifiers, and during this period the rectifiers can be fired by a suitably applied gating pulse. This is illustrated in FIGS. 7 and 8. FIG. 7 shows a gating pulse applied during the period $t_0$ to $t_1$, and extending into the period $t_1$ to $t_2$. FIG. 8 shows the resulting current through load resistor 55 due to the firing of rectifier 53. During the interval prior to $t_1$ no current flows because the rectifiers are back-biased. At a time after $t_1$, rectifier 53, being forward-biased, fires and current begins to flow through rectifier 53 and through load resistor 55 in the direction from A to B. During a portion of this time, rectifier 54 remains off. At time $t_3$, however, the gating pulse delayed by delay network 56, is applied to rectifier 54, firing the latter. The current in resistor 55, due to the firing of rectifier 54, flows in the direction B to A, which direction is opposite to the direction of current flow from rectifier 53. Since the currents are made equal, the net current in resistor 55 after time $t_3$ is zero.

Figure 9:
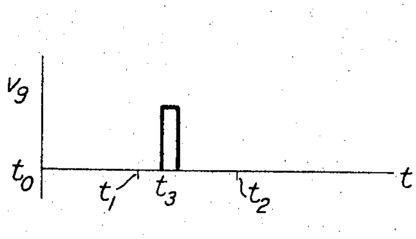

FIG. 9 shows the delayed gating pulse applied to rectifier 54. FIG. 10 shows the current through resistor 55 due to the firing of rectifier 54. FIG. 11 shows the net current flow in resistor 55, which is essentially triangular in shape.

At time $t_2$, the secondary voltage reverses polarity and the rectifiers are cut off.

In the embodiment of FIG. 5, the rectifier 53 fires as the alternating voltage across it assumes the proper polarity. The current produced is essentially sinusoidal as illustrated in FIG. 8. The second rectifier 54, however, is turned on later in the period of the alternating current source. In order for the current from the second rectifier to promptly cancel the current through the load resistor 55, it must initially rise to the current level of the first rectifier before it starts to conform to the alternating current wave shape. In FIG. 10, a rapid rise in current at time $t_3$ was assumed. In fact, however, this rise takes a finite time since the current through the transforming inductance L cannot change instantaneously. For those applications which require a termination of the pulse that is more rapid than is inherently possible with the circuit of FIG. 5, modification of this basic circuit is desirable.

FIG. 12 illustrates arrangements for providing the initial current needed for an accelerated current rise time. The modification, which is symmetrically applied to both rectifiers to permit rapid pulsing on and off at any time during the alternating current cycle, comprises a pair of asymmetric conducting devices, such as diodes, and a capacitor. Referring to the upper portion of FIG. 12, a capacitor 70 is connected in series with silicon controlled rectifier 71. A charging diode 72 is connected between capacitor 70 and the center-tap of transformer 85. A damping diode 73 is connected in parallel with capacitor 70.

The lower portion of FIG. 12 similarly includes a capacitor 80 connected in series with silicon controlled rectifier 81. Charging diode 82 is connected between capacitor 80 and the center-tap of transformer 85. Damping diode 83 is connected in parallel with capacitor 80.

The remaining components of the circuit include the load resistor 84, and alternating current source 86.

Diodes 72 and 82 are poled so as to charge capacitors 70 and 80, respectively, with a polarity to aid the flow of current through the rectifiers. For the connections assumed in FIG. 12, the capacitors charge up as indicated. It will be noted that each capacitor charges during that portion of the alternating current cycle when the associated rectifier cannot conduct. Thus, charging occurs between output pulses.

When a rectifier is turned on by a trigger pulse, its associated capacitor discharges. The capacitor and the inductance L of the transformer ring at a rate given by their resonant frequency $\omega=(LC)^{-1/2}$. After a quarter cycle of this ringing, the damping diode in parallel with the capacitor closes, damping the ringing circuit. By this time, the transformer current due to source 86 has built up and flows as described in connection with the embodiment of FIG. 5.

The rise time of the pulse is equal to one-quarter of the period of the ringing circuit. The amplitude of the initial current is proportional to the voltage across the capacitor, and is adjusted to the desired value. In the embodiment of FIG. 12, the maximum voltage is limited to one-half the transformer secondary voltage. As this may not be adequate in high current pulse generators, a separate charging source may be required. Such an arrangement is illustrated in FIG. 13.

This circuit is similar to the embodiment of FIG. 12 except that the charging diodes charge the capacitors from a separate source. More specifically, the pulser comprises, as before, a pair of silicon controlled rectifiers 90 and 91 connected to pass current through the load resistor 89, in opposite directions. In series with rectifier 90, there is a capacitor 92 and the parallel-connected damping diode 93. Similarly, in series with rectifier 91, there is a second capacitor 94 and the parallel-connected damping diode 95. Capacitors 94 and 92 are charged in series from the tertiary winding 97 of transformer 98 through control rectifier 96. By providing a separate capacitor charging source, preferably an adjustable one, the voltage across the capacitors can be adjusted so as to provide the required initial current. In the illustrative embodiment of FIG. 13, the tertiary winding is provided with taps for selecting the required charging voltage.

Transformer 98 is also provided with a center-tapped secondary winding 99 which connects to the rectifiers 91 and 90 and to the load 89 as described above in connection with FIG. 12. A source of alternating current 100 is connected to the transformer primary.

In all cases it is understood that the above-described arrangements are illustrative of a small number of the many possible specific embodiments which can represent applications of the principles of the invention. For example, in the embodiment of FIG. 13, a separate transformer can be used instead of the tertiary winding 97. In addition, various means for equalizing the two discharge currents can be included in the discharge circuits as required. Thus, numerous and varied other arrangements can readily be devised in accordance with these principles by those skilled in the art without departing from the spirit and scope of the invention.

What is claimed is:

1. A pulse generator comprising:
first and second substantially similar current discharge circuits connected across a common load impedance;
the first of said circuits connected to pass current through said load in one direction;
the second of said circuits connected to pass current through said load in a direction opposite to said one direction;
means for discharging said first circuit through said load over a prescribed time interval;
and means for discharging said second circuit through said load over a period of time commencing during said prescribed time interval.

2. A pulse generator comprising:
a pair of substantially identical discharge circuits arranged in a bridge configuration;
the first of said circuits comprising a capacitor in a first branch of said bridge and a current control element in a second branch of said bridge;
the second of said circuits comprising a capacitor in a third branch of said bridge and a current control element in a fourth branch of said bridge;
an output circuit common to both of said discharge circuits connected diagonally across said bridge;
said control elements connected to pass current through said load in opposite directions;
means for charging said capacitors;
and means for causing said control elements to conduct and to thereby discharge said capacitors during overlapping periods of time.

3. The generator according to claim 2 wherein said control elements are silicon controlled rectifiers.

4. The generator according to claim 2 wherein said control elements and said capacitors are located in mutually opposite branches of said bridge.

5. The generator according to claim 2 wherein said control elements and said capacitors are located in adjacent branches of said bridge.

6. A pulse generator comprising:
a pair of current control devices each having an anode and a cathode;
a load circuit;
means for connecting the cathode of one of said devices and the anode of the other of said devices to one end of said load circuit;
an alternating current source;
a transformer having a center-tapped secondary winding;
means for connecting said source to the primary winding of said transformer;
means for connecting one end of the secondary winding to the anode of said one control device;

means for connecting the other end of the secondary winding to the cathode of said other control device;

means for connecting the other end of said load circuit to the center-tap of said transformer;

and means for triggering said control devices in sequence.

7. A pulse generator comprising:

a pair of current control devices each having an anode and a cathode;

a load circuit;

means for connecting the cathode of one of said devices and the anode of the other of said devices to one end of said load circuit;

an alternating current source;

a transformer having a center-tapped secondary winding;

means for connecting said source to the primary winding of said transformer;

means for connecting the other end of said load circuit to the center-tap of said transformer;

four asymmetrical conducting members each having an anode and a cathode;

means for connecting the anode of the first of said members to one end of the transformer secondary winding;

means for connecting the cathode of said first member to the anode of said first control device;

a first capacitor connected between the anode and the cathode of said first member;

means for connecting the cathode of a second of said members to the anode of said first control device;

means for connecting the anode of said second member to the center-tap;

means for connecting the cathode of a third of said members to the other end of the transformer secondary winding;

means for connecting the anode of said third member to the cathode of said second device;

a second capacitor connected between the anode and cathode of said third member;

means for connecting the anode of the fourth of said members to the cathode of said second control device;

means for connecting the cathode of said fourth member to the center-tap;

and means for triggering said current control devices in sequence.

8. A pulse generator comprising:

a transformer having a primary winding and a center-tapped secondary winding;

an alternating current source connected to the primary winding of said transformer;

four diodes, each having an anode and a cathode connected in series between the ends of said secondary winding with the cathode of the first of said diodes connected to the cathode of the second of said diodes and the anode of the third of said diodes connected to the anode of the fourth of said diodes;

means for connecting the anode of said second diode and the cathode of said third diode to the center-tap of said secondary winding;

a first capacitor connected across said first diode;

a second capacitor connected across said fourth diode;

a pair of silicon controlled rectifiers, each having an anode and a cathode, connected in series with the anode of one of said rectifiers connected to the cathode of said second diode and cathode of the other of said rectifiers connected to the anode of said third diode;

a load resistor;

means for connecting one end of said resistor to the center-tap of said transformer;

means for connecting the cathode of said one rectifier and the anode of said other rectifier to the other end of said resistor;

capacitors connected across said first and fourth diodes;

and means for triggering said rectifier in time sequence.

9. A pulse generator comprising:

a transformer having a primary winding and a center-tapped secondary winding;

an alternating current source connected to the primary winding of said transformer;

a first asymmetrical current control device, a pair of diodes, and a second asymmetrical current control device serially connected across said secondary winding and poled to conduct current in the same direction;

a load circuit having one end connected to the center-tap of said secondary winding and the other end connected between said pair of diodes;

a first capacitor connected across the first of said diodes;

a second capacitor connected across the second of said diodes;

means for charging said capacitors;

and means for triggering said devices in sequence.

10. The generator according to claim 9 wherein said capacitors are charged in series from a tertiary winding on said transformer.

11. A pulse generator comprising:

a transformer having a primary winding and a center-tapped secondary winding;

an alternating current source connected to said primary winding;

a first diode, a pair of current control devices, and a second diode serially connected across said secondary winding in the indicated order and poled to conduct current in the same direction;

a capacitor connected in parallel with each of said diodes;

a load circuit having one end connected to the center-tap on said transformer and the other end connected between said control devices;

means for charging each of said capacitors with a polarity to aid the flow of current in the given direction;

and means for triggering said control devices in sequence following the charging of said capacitors.

12. A pulse generator comprising:

a common output load circuit;

a first current source connected to pass a pulse of current through said load circuit in one direction during a prescribed interval of time;

a second current source connected to pass a substantially identical pulse of current through said load circuit in the opposite direction;

means for initiating current flow from said first source at a given time;

and means for initiating current flow from said second source at a time later than said given time but during the interval of time for which the pulse of current from said first current source passes through said load circuit.

References Cited by the Examiner

UNITED STATES PATENTS

| | | | |
|---|---|---|---|
| 2,409,897 | 10/1946 | Rado | 307—108 X |
| 3,025,411 | 3/1962 | Rumble | 320—1 X |

OTHER REFERENCES

Millman, J.: "Vacuum Tube and Semiconductor Electronics," McGraw-Hill Book Company, Inc., pages 420–424, 1958.

References Cited by the Applicant

UNITED STATES PATENTS 2,811,654 10/1957 Dodds.

BERNARD KONICK, *Primary Examiner.*

IRVING L. SRAGOW, *Examiner.*

V. P. CANNEY, *Assistant Examiner.*